(12) United States Patent
Ramirez et al.

(10) Patent No.: US 7,589,943 B2
(45) Date of Patent: Sep. 15, 2009

(54) GIC REDUCER

(76) Inventors: Vanessa de los Angeles Ramirez, 1521 Alton Rd., #692, Miami Beach, FL (US) 33139; Alberto Raul Ramirez, Cerro Quebrada Blanca 548, Mendoza (AR) 5500

( * ) Notice: Subject to any disclaimer, the term of this patent is extended or adjusted under 35 U.S.C. 154(b) by 44 days.

(21) Appl. No.: 11/728,136

(22) Filed: Mar. 24, 2007

(65) Prior Publication Data
US 2008/0232006 A1 Sep. 25, 2008

(51) Int. Cl.
H02H 7/04 (2006.01)
(52) U.S. Cl. .......................................... 361/35
(58) Field of Classification Search .................. 361/35, 361/38
See application file for complete search history.

(56) References Cited

U.S. PATENT DOCUMENTS

| 5,179,489 A | 1/1993 | Oliver |
| 5,436,786 A | 7/1995 | Pelly |
| 5,751,530 A | 5/1998 | Pelly |
| 6,067,217 A | 5/2000 | Kida et al. |
| 2002/0047439 A1* | 4/2002 | Leijon et al. ................. 310/179 |
| 2006/0197511 A1* | 9/2006 | Af Klercker Alakula .... 323/247 |

FOREIGN PATENT DOCUMENTS

WO    WO 2005001857 A1 *  1/2005

OTHER PUBLICATIONS

Molinski et al, Shielding Grids from Solar Storms, IEEE Spectrum Magazine, Nov. 2000, p. 57, col. 2, USA.
Molinski et al, Shielding Grids from Solar Storms, IEEE Spectrum Magazine, Nov. 2000, p. 60, col. 2, USA.

* cited by examiner

*Primary Examiner*—Stephen W Jackson
*Assistant Examiner*—Ann T Hoang

(57) ABSTRACT

A device for reducing Geomagnetically-Induced Currents (GIC) in transformer apparatus of an AC power system that comprises a resistor (R10) in parallel with a protective varistor (V10) forming a passive-circuit arrangement. Such passive-circuit arrangement is connected on one end (N) to the neutral of the transformer and grounded on the other end (G). The combination of these elements produces a conductive path from said neutral to ground resulting in a proper reduction of said GIC currents, while substantially sustaining the neutral-grounding characteristics of said transformer.

3 Claims, 1 Drawing Sheet

GIC REDUCER

TECHNICAL FIELD

Figure 1:
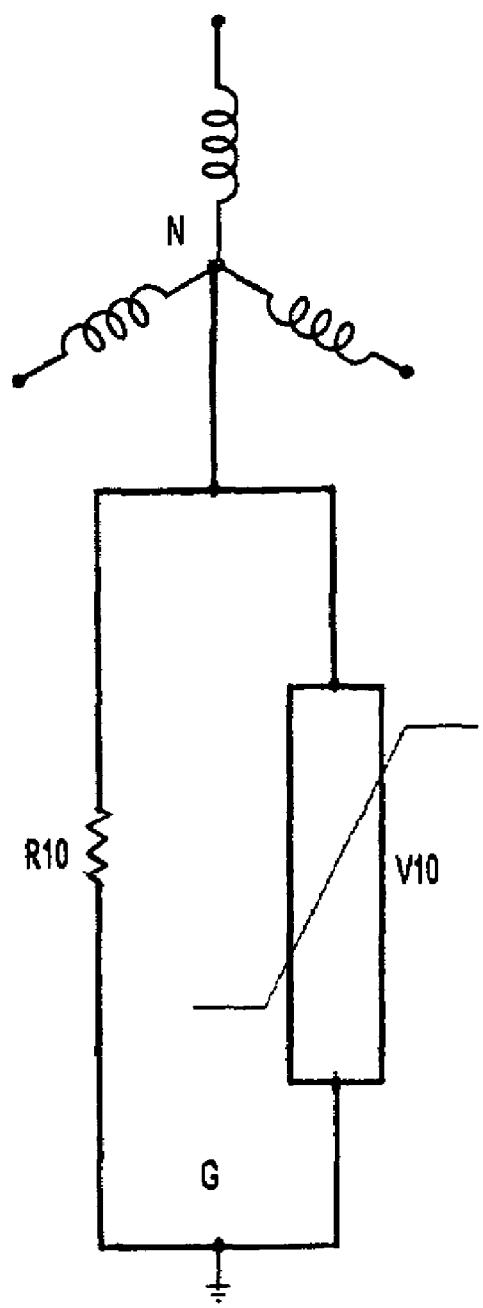

This invention relates to a scheme for reducing Geomagnetically Induced Currents (GIC) in a transformer apparatus of an AC power system by means of a passive device connected to the neutral end of a winding of such apparatus, part of a GIC circuit.

BACKGROUND INFORMATION

In its most common form, GIC is a phenomenon that takes place when high magnetic fields produced by electric particles emanated from the sun, periodically impinging our planet interact with the conductors of transmission and distribution circuits. Such interaction causes, according to the laws of physics, the induction of currents in these circuits. GIC can therefore flow in the network reaching the power transformers as well as the instrument transformers, shunt reactors and phase shifters connected to the transmission lines, circulating through their phase connections into their earthed neutral;. The most important effects are related to the saturation of those apparatus' magnetic circuitry. In general it can cause wave distortion and equipment overheating. Possible outcomes of this disturbance are the malfunction of protective systems and/or failure as well as a deterioration of the grid's performance, including voltage collapse.

The last well-remembered event that epitomizes the potential harmful consequences of this phenomenon; took place in March 1989, when a geomagnetic storm produced a major blackout in eastern Canada and part of the northeastern US, leaving the complete region powerless for many hours, affecting several million customers. Moreover the same meteor caused the destruction of a nuclear-plant's generator transformer in eastern United States.

Three basic approaches have been suggested in the literature to cope with this phenomenon; they are discussed as follows:

1) re-engineering existing power apparatus prone to the GIC effects, so that they perform more robustly under these conditions. U.S. Pat. No. 5,179,489 (1993) proposes altering the magnetic circuits of transformers in the system to reduce half-cycle saturation and associated high current peak; also providing means of countering the difference of potential between spaced grounding points in the system;
2) turning the power grid off causing a planned blackout when a magnetic storm is imminent; Molinski discusses this idea in an article of the IEEE Spectrum Magazine (2000);
3) adding active blocking components to the transformer to impede GIC flow, as per U.S. Pat. No. 5,751,530 (1998), proposing a capacitor device from the neutral of the transformer to ground. It is noted that this document makes a description of the problem and circuitry involved. U.S. Pat. No. 5,436,786 (1995) blocks GIC by means of controlled SCRs with surge protection. Also U.S. Pat. No. 6,067,217 (2000) even though unrelated to GIC, proposes current limiting hardware of the active type to limit fault currents, in this latter case not from neutral to ground but in each of the three phases instead.

Disadvantages of these approaches:

While 1) would potentially improve the performance of the apparatus, its planned-outage timing and cost, engineering challenges, added loss of revenue and system reliability during such a process makes it absolutely unrealistic.

Regarding 2), while it will definitely protect the integrity the system, blackouts are very onerous and dicey. However is questionable that it can be done effectively due to the short lead time from the storm front detection (less than an hour); most thermal generating plants require one hour o more to shut down. Nevertheless it is not possible to predict ahead of time whether the intensity of a storm will warrant the extremeness of a self-inflicted blackout.

Finally 3) appears as an obvious way to knock this current, yet quite compromising in this application; for in these cases transient-phenomena wave distortions developed under GIC, the presence of capacitors in series with the transformer, can cause undesired ferroresonant conditions for some of the numerous natural frequencies created. Moreover the required capacitor must be of an impractical large size to minimize its steady-state impedance impact. In addition switching capacitors on/off is never trouble free; neither discharging them is. But in this case both things are required. Indeed this becomes a risky proposition stemming from the fact that the full charge induced in the transmission line/transformer by the magnetic storm is stored in this very neutral capacitor. For this element is sitting in a critical transformer location; therefore this phenomenology requires active components to reckon with. Consequently the proposed design includes a number of electronic/control components which pose reliability concerns of their own, not to mention cost-effectiveness. In conclusion this concept, which implies a problematic prosthesis to existing equipment, would most certainly be considered unacceptable for the utility industry as it is also suggested in the aforementioned IEEE Spectrum article.

Likewise considerations entail the addition of different components to the phases of transformers, i.e. in a phase-to-neutral mode as opposed to neutral-to-ground, as will be presented below. This idea is very dependent on controlled switching, which includes plenty power electronics; it can be stated again that it becomes a major and compromising prosthesis to existing equipment; it may just compound (triplicate) some of the reliability problems described above. Furthermore incorporating hardware in the respective phases imposes both a fill current/power rating and three-phase fault duty. On the other hand the performance of an active-type means, requiring command-and-control, would be considered very questionable under magnetic storms which normally jam these systems.

In sum, it should be acknowledged that the inability on the part of the industry to adopt an acceptable GIC countermeasure is a serious matter, for it leaves it unprotected before future solar storms while it has been established that some of them could potentially be very damaging to the electric power infrastructure.

SUMMARY

This invention relates to a scheme for reducing Geomagnetically Induced Currents (GIC) in a transformer apparatus of an AC power system by means of a passive device, connected from neutral to ground of a three-phase winding of such apparatus, part of the GIC circuit under consideration. Moreover there is no requirement for supervisory control or semiconductor power electronics whatsoever; such passive device is inserted in series in a circuit made primarily of a transmission line and a transformer winding (both in series) with ground/earth return.

According to elementary circuit theory a series resistor can reduce drastically the GIC in the transformer winding to be protected. This effect is possible due to two basic reasons:

i) a neutral resistor is three-times more effective than a phase one for reducing ground/earth currents, like GIC, since its magnitude gets multiplied by a factor of three with respect to the corresponding phase resistors, according to classical symmetrical-component theory; the principle holds regardless of frequency;

ii) the line/transformer circuit considered is designed primarily to be lossless so that a resistance inserted in series makes a major/crucial difference; yet placing the resistor from neutral to ground maintains the lossless condition to the AC three-phase currents, for they are balanced and do not circulate this path.

In addition the resistor is connected in parallel with a protective varistor, forming the proposed passive device. On the other hand, today's satellite detection can provide timely information so that this device can be switched on reliably (in manual mode preferably) to protect equipment, in contrast to the active-type options whose control circuitry can easily be jammed under GIC storms. Still, the relatively short storm-duration insertion of the device consents a temporary deviation from the typical transformer solid-neutral grounding to a quasi-solid one through the passive device proposed, yet basically inconsequential to the equipment due to the well-established track record and quality of protective varistor technology. Nonetheless there would be no limitation to keep the device for longer periods. Clearly the power apparatus could be at a real risk if it were to face a major solar storm unprotected.

OBJECTS AND ADVANTAGES

It is, therefore, an object of this invention to provide a passive device to cope with the GIC problem simply by applying efficiently Ohm's law to reduce a circuit current. A neutral resistor becomes a very effective means to limit ground/earth currents; thus GIC is very sensitive to a neutral-resistor insertion becoming thus a crucial difference in order to reduce its magnitude while maintaining the efficiency and neutral grounding characteristics of the equipment.

Furthermore the passive elements involved are built to be quite robust, stable and well behaved. Besides, neutral-to-ground components do not get any significant power/fault duty. Also the device is normally not connected unless there is imminence of a magnetic storm, but foremost switching it on/off is both instantaneous and trouble free; which can actually be done manually to avoid ancillary-systems malfunction during these magnetic storms. It is also an advantage of this invention to provide a passive element made of inexpensive standard Distribution-Class components. The foregoing and other objects, features and advantages of the invention will be apparent from the following more particular description of preferred embodiments of the invention, as illustrated in the accompanying drawing.

DESCRIPTION—FIG. 1

FIG. 1 depicts a one-line diagram of a circuit embodying the present invention as it applies to reduce the GIC currents on a transformer. FIG. 1 also shows a tank circuit with two parallel branches: one having a resistor R10 and the other having a protective varistor V10; both connected from the transformer neutral N to ground G.

OPERATION—FIG. 1

Regarding the embodiment of FIG. 1, it shows a resistor R10, sized according to any given design criteria that assumes storm severity, reducing thus the GIC current flowing from the transformer neutral (N) to ground, while protective varistor V10 in parallel (preferably of metal-oxide type) is rated to coordinate with the transformer's neutral (N) Basic Insulation Level (BIL), following routinely well-established guidelines of the industry. Moreover all preceding analytical work indicates it would be basically a negligible chance for the GIC currents, particularly after reduction, to produce a voltage drop in R10 falling into the protection-threshold range of V10, thus causing activation of the varistor. Such activation would short the GIC currents into V10 for an undesired flow through a low-resistance path. Instead they are forced to circulate into the R10 path achieving the required reduction in magnitude. Besides any unlikely simultaneous overvoltage/current surge, outside the GIC phenomenon, requiring ground reference or bleeding, consistent with the apparatus BIL, gets handled by V10 with no interference whatsoever with the longer-term GIC problem, for the protective varistor returns instantaneously to its non-conductive state after such surge elapses.

CONCLUSION, RAMIFICATIONS AND SCOPE

It should be apparent the present invention is capable of reducing the harmful GIC currents in a transformer of an AC power system. Furthermore it yields the following objects and advantages:

it is a passive device;

it takes full advantage of the existing graded insulation associated to solid-neutral grounding of transformer apparatus;

it works under a basic operating principle and layout;

it can be switched on/off instantaneously, simply and trouble free;

it can operate without risk of solar-storm jamming;

it has very few components;

it is cost effective;

it requires neither data acquisition nor supervisory control;

it requires no feedback control;

its power loss is substantially negligible;

it comprises components of the distribution voltage class;

it reduces also the transformer third-harmonic magnetizing currents going through the neutral; effect even more beneficial during solar storms;

it has protective characteristics applying also straightforwardly to grounded-neutral shunt reactor apparatus;

it has protective characteristics applying also straightforwardly to grounded-neutral potential transformers (PT);

it has protective characteristics applying also straightforwardly to grounded-neutral phase-shifter transformers;

it requires an insignificant modification to the existing equipment/plant.

Thus while the preferred embodiments of the invention have been illustrated herein, it is to be understood that changes and variations may be made by those skilled in the art without departing from the spirit and scope of appending claims.

We claim:

1. A resistive external device to reduce Geomagnetically-Induced Currents (GIC) in an AC power system flowing to ground from the neutral of a wye-connected three-phase winding of a transformer apparatus, while substantially sustaining its neutral-grounding characteristics, comprised of a parallel circuit arrangement connected from said three-phase winding neutral to ground, comprising a linear resistor in parallel with a non-linear resistor yielding a parallel equivalent resistor of increasing conductivity with current magnitude, rendering thus a selected equivalent resistance under selected GIC conditions so as to reduce them to harmless levels, as well as providing a contingent by-pass grounding path through a low equivalent resistance prevailing under large ground fault currents.

2. The resistive external device of claim 1 wherein said non-linear resistor comprises a protective varistor.

3. The resistive external device of claim 1 comprising a resistive means.

* * * * *